(12) United States Patent
Bertrand et al.

(10) Patent No.: US 7,808,099 B2
(45) Date of Patent: Oct. 5, 2010

(54) LIQUID THERMAL INTERFACE HAVING MIXTURE OF LINEARLY STRUCTURED POLYMER DOPED CROSSLINKED NETWORKS AND RELATED METHOD

(75) Inventors: Randall J. Bertrand, Hinesburg, VT (US); Mark S. Chace, Beacon, NY (US); David L. Gardell, Fairfax, VT (US); George J. Lawson, Barre, VT (US); Yvonne Morris, Randleman, NC (US); Charles L. Reynolds, Red Hook, NY (US); Jiali Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 12/115,809

(22) Filed: May 6, 2008

(65) Prior Publication Data

US 2009/0281254 A1 Nov. 12, 2009

(51) Int. Cl.
*H01L 23/10* (2006.01)
(52) U.S. Cl. ............... 257/707; 361/705; 361/706
(58) Field of Classification Search .......... None
See application file for complete search history.

(56) References Cited

U.S. PATENT DOCUMENTS

| | | | | |
|---|---|---|---|---|
| 4,766,176 A * | 8/1988 | Lee et al. | ............... | 525/100 |
| 5,864,176 A | 1/1999 | Babock et al. | | |
| 6,391,442 B1 * | 5/2002 | Duvall et al. | ............... | 428/348 |
| 6,592,997 B2 * | 7/2003 | Lewis et al. | ............... | 428/447 |
| 6,597,575 B1 * | 7/2003 | Matayabas et al. | ........ | 361/705 |
| 6,620,515 B2 * | 9/2003 | Feng et al. | ................ | 428/447 |
| 6,767,765 B2 * | 7/2004 | Chiu | .................... | 438/122 |
| 6,811,725 B2 * | 11/2004 | Nguyen et al. | ............ | 252/511 |
| 7,030,485 B2 | 4/2006 | Houle et al. | | |
| 7,169,245 B2 * | 1/2007 | Murray et al. | ........... | 156/73.1 |
| 7,527,830 B2 * | 5/2009 | Asaine | ..................... | 427/387 |
| 2003/0183909 A1 * | 10/2003 | Chiu | ...................... | 257/667 |
| 2003/0234074 A1 * | 12/2003 | Bhagwagar | ............... | 156/325 |
| 2005/0049350 A1 * | 3/2005 | Tonapi et al. | ............ | 524/492 |
| 2006/0128068 A1 * | 6/2006 | Murray et al. | ............ | 438/120 |
| 2006/0186909 A1 * | 8/2006 | Aube et al. | ............... | 324/760 |
| 2006/0264566 A1 * | 11/2006 | Cassar et al. | .............. | 524/588 |
| 2007/0059864 A1 | 3/2007 | Huang et al. | | |
| 2007/0161521 A1 | 7/2007 | Sachdev et al. | | |
| 2007/0219312 A1 * | 9/2007 | David | ....................... | 524/588 |
| 2009/0068441 A1 * | 3/2009 | Swaroop et al. | ........... | 428/329 |

FOREIGN PATENT DOCUMENTS

| | | |
|---|---|---|
| WO | 02096636 A1 | 12/2002 |
| WO | 03064148 A1 | 8/2003 |
| WO | 2005013362 A1 | 2/2005 |
| WO | 2005096320 A2 | 10/2005 |

* cited by examiner

*Primary Examiner*—Randy Gulakowski
*Assistant Examiner*—Robert Loewe
(74) *Attorney, Agent, or Firm*—Wenjie Li; Ira D. Blecker

(57) ABSTRACT

A liquid thermal interface (LTI) including a mixture of a linearly structured polymer doped with crosslinked networks and related method are presented. The LTI exhibits reduced liquid polymer macromolecule mobility, and thus increased surface tension. An embodiment of the method includes mixing a crosslinker with a linearly structured polymer to form a mixture, wherein the crosslinker includes a base agent including a vinyl-terminated or branched polydimethylsiloxane, and a curing agent including a hydrogen-terminated polydimethylsiloxane; and curing the mixture. The crosslinker functions as cages to block linear or branched linear macromolecules and prevents them from sliding into each other, thus increasing surface tension of the resulting LTI.

3 Claims, 5 Drawing Sheets

LIQUID THERMAL INTERFACE HAVING MIXTURE OF LINEARLY STRUCTURED POLYMER DOPED CROSSLINKED NETWORKS AND RELATED METHOD

BACKGROUND

1. Technical Field

The disclosure relates generally to integrated circuit (IC) chip packaging and testing, and more particularly, to a liquid thermal interface and related method.

2. Background Art

During integrated circuit (IC) chip fabrication and packaging, IC chips are tested and burned in at high power to determine whether they perform as required. The high power testing results in the IC chip being exposed to high temperatures. As IC chip feature sizes have continually decreased, more power is required for driving a unit area of silicon (Si) devices, resulting in more heat generation. In addition, higher burn-in powers result in heat gradients (e.g., of up to 50° C.) across the IC chip.

The burn in testing tool comprises a test socket and heat sink as well as related mechanical structures and electronics. During burn-in testing, the tester heat sink is thermally coupled to the IC chip to dissipate heat. Previous generations of IC chips were burned in using heat sinks that were coated with a flat, soft alloy to improve thermal contact. Helium may have also been injected into the interface between the IC chip and heat sink to improve the thermal interface because helium has a better thermal conductivity than air. The advantage of the dry helium interface is the heat sink is easily removed from the chip when burn-in is complete. A dry interface for burn-in testing, however, is inadequate for future IC chips due to the increased heat generation. PAO oil has been used as a liquid thermal interface (LTI) to increase heat transfer. However, PAO oils can degrade at the high temperatures and long times necessary for burn-in testing. Water based fluids have been used as LTI in test; they have excellent thermal performance but are not suitable for high temperatures and can cause corrosion of sensitive devices. Improved LTI is also needed in the final package between the IC chip and lid or between the lid and heat sink.

When the heat sink is pressed into contact with the chip with a force there will generally be a few actual points of contact. The remainder of the area will have a gap which is defined by the flatness of the two surfaces and the force applied. The average thickness of the gap may be on order of 2 microns if great care is taken in the manufacture of the chip and heat sink. The LTI fills these gaps resulting in improved contact between the chip and heat sink. LTIs can be used to thermally couple any two surfaces, for example, heat exchangers or engine components.

SUMMARY

A liquid thermal interface (LTI) including a mixture of a linearly structured polymer doped with crosslinked networks and related method are presented. The LTI exhibits reduced liquid polymer macromolecule mobility, and thus increased surface tension. An embodiment of the method includes mixing a crosslinker with a linearly structured polymer to form a mixture, wherein the crosslinker includes a base agent including a vinyl-terminated or branched polydimethylsiloxane, and a curing agent including a hydrogen-terminated polydimethylsiloxane; and curing the mixture. The crosslinker functions as cages to block linear or branched linear macromolecules and prevents them from sliding into each other, thus increasing surface tension of the resulting LTI.

A first aspect of the disclosure provides a liquid thermal interface (LTI) comprising: a mixture of a linearly structured polymer doped with crosslinked networks.

A second aspect of the disclosure provides a method comprising: mixing a crosslinker with a linearly structured polymer to form a mixture, wherein the crosslinker includes a base agent including a vinyl-terminated or branched polydimethylsiloxane, and a curing agent including a hydrogen-terminated polydimethylsiloxane; and curing the mixture.

A third aspect of the disclosure provides a liquid thermal interface (LTI) comprising: a linearly structured polymer doped with crossed-linked networks, the LTI having the following chemical structure:

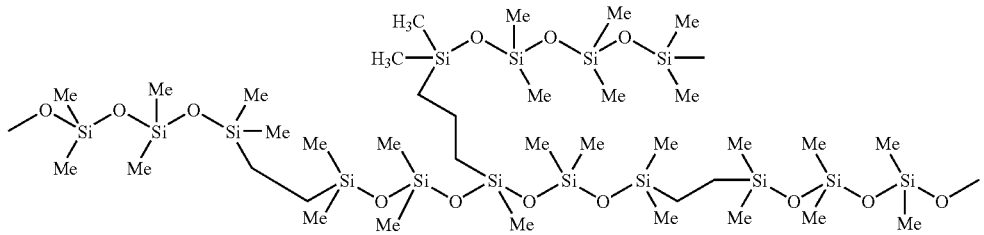

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1A:
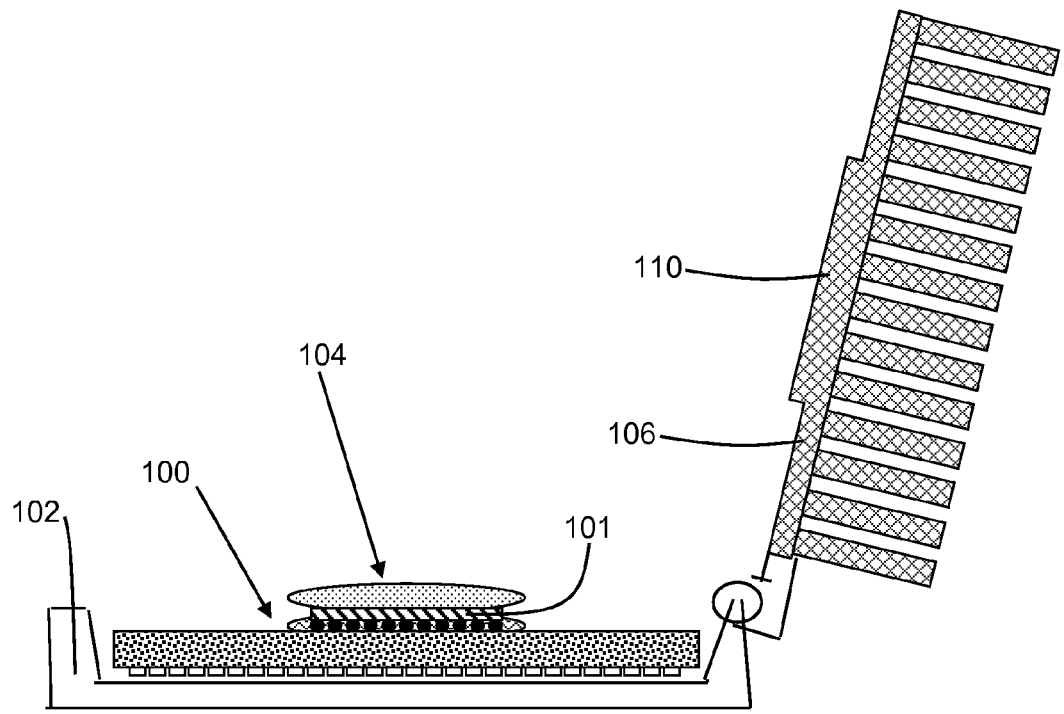
FIGS. 1A-1B show an illustrative IC chip package to which the LTI according to the disclosure may be applied.
Figure 1B:
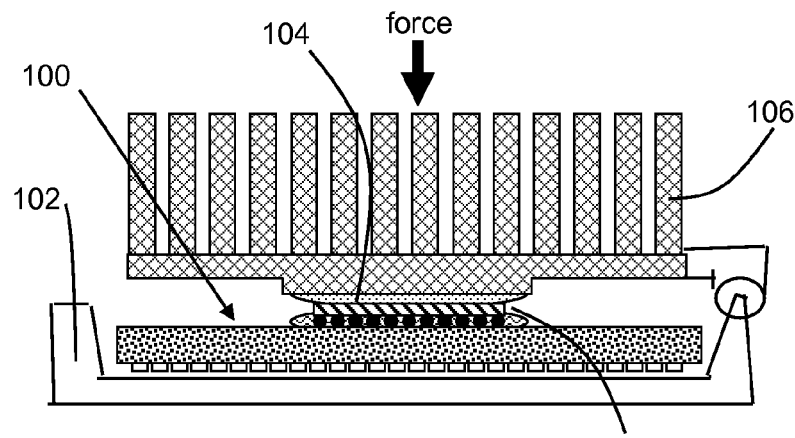

FIG. 1A shows an integrated circuit (IC) chip package 100 including an IC chip 101 inserted into a test socket 102 which is part of the burn-in tester (not shown). A liquid thermal interface (LTI) 104 is applied to the device. FIG. 1B shows tester heat sink 106 pressed into contact with IC chip 101 by force F. The force may be applied by parts of the socket or tester which are not shown. Thus, LTI 104 thermally couples IC chip 101 to test heat sink 106.

Figure 2:
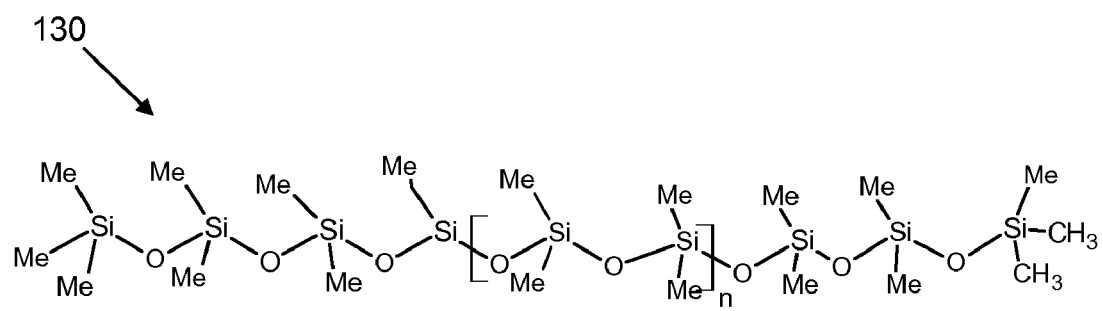
FIG. 2 shows a linearly structured polymer base resin according to the disclosure.
Figure 3:
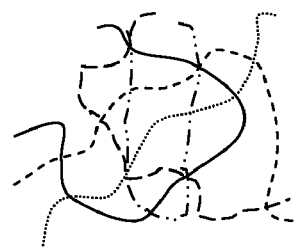
FIG. 3 shows a schematic of un-linked strands of the linearly structured polymer.

FIG. 2 shows a linearly structured polymer 130, which is used as a base resin for an improved LTI 150 (FIG. 5) according to the disclosure. In one embodiment, linearly structured polymer 130 may include a linear siloxane, such as polydimethyl siloxane (PDMS). In FIG. 2, n is an integer of $Si_2O_2(CH_3)_4$ units. In another embodiment, linearly structured polymer 130 may include silicone oil. The silicone oil or linear siloxane is used as a base resin for an improved LTI according to the disclosure for a number of reasons. First, both are thermally stable chemical fluids due to their semi-inorganic covalent bonds with a bonding energy of silicon-oxygen-silicon (Si—O—Si), i.e., approximately 450 kiloJoules per mol (kJ/mol) compared to carbon-carbon bonds of approximately 300 kJ/mol. In addition, each exhibits excellent wetting on the surfaces of an IC chip 101 (i.e., silicon (Si die) and lid 110 (FIG. 1A). Furthermore, each are chemically inert, soluble (dispersible) in Xylene or an isopropyl alcohol (IPA) and Xylene mixture, which may allow removal in non-toxic solutions, e.g., a water based surfactant solution. Silicone oil or a linear siloxane also exhibit a wide range of viscosity selections that facilitate dispensing and cleaning needs, e.g., 0.65-2.5 McSt (dynamic viscosity units, centistroke) depending on molecular weight. One challenge is that silicon oil or linear siloxane have a low surface tension, such that they move around too much and cannot be used as a LTI materials. FIG. 3 shows a schematic of un-linked strands of linearly structured polymer 130, its linear chemical structure with bulky methyl groups extending out along both sides of Si—O—Si backbond contribute to its low surface tension. In order to address this situation, a silicone crosslinking network system is employed in linearly structured polymer 130 (e.g., silicone oil) so as to approach its wetting-control onset point while still maintaining its cleanability and mobility.

Figure 4:
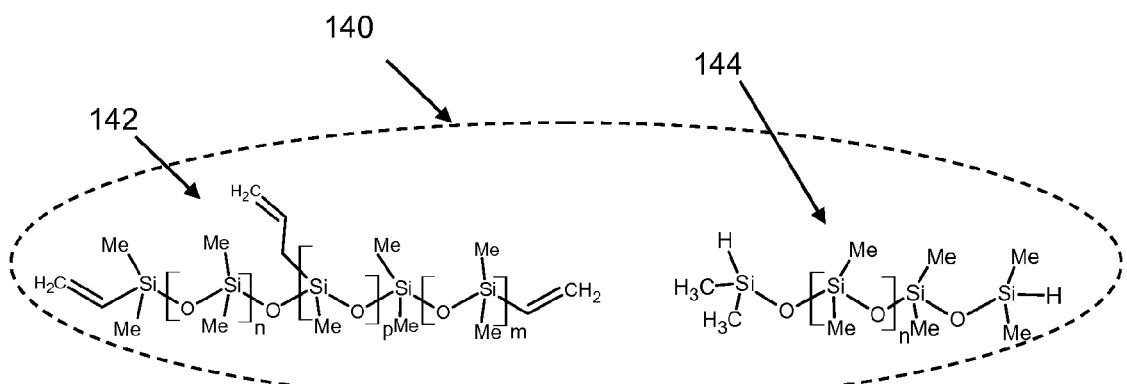
FIG. 4 shows a crosslinker including a base agent and a curing agent for mixing with the linearly structured polymer of FIG. 3.
Figure 5A:
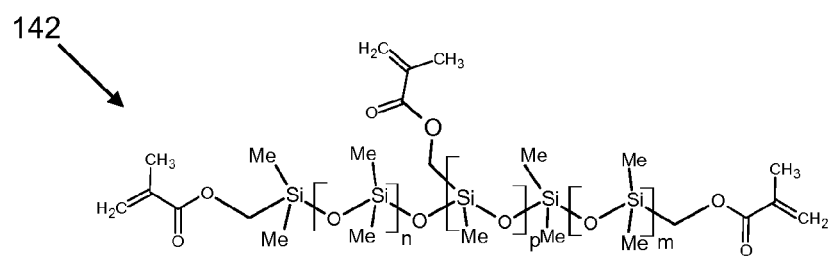
FIGS. 5A-D show various embodiments of a base agent.
Figure 5B:
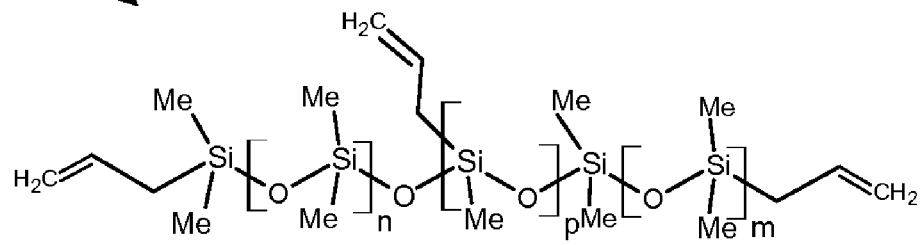
Figure 5C:
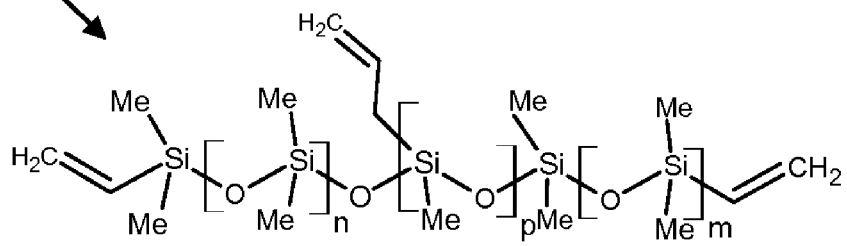
Figure 5D:
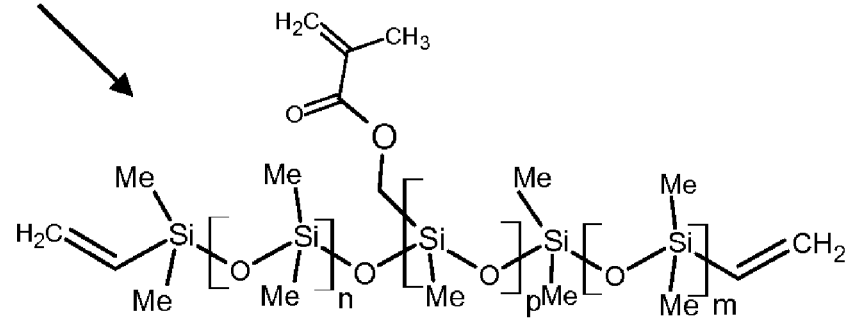

FIG. 4 shows a crosslinker 140 for mixing with linearly structured polymer 130 to form a mixture. The type of polymerization is an additional reaction such that no byproducts are generated in the course of polymerization. As illustrated, crosslinker 140 comprises a base agent 142 including a vinyl-terminated or branched polydimethylsiloxane and a curing agent 144 including a hydrogen-terminated polydimethylsiloxane. For base agent 142, m=1-10,000, n=1-10,000, p=0-10,000; q=0-10,000 for curing agent 144, n=1-1,000. In one embodiment, base agent 142 may include at least one of: a) a silicone with alkylvinyl terminals or branches (FIG. 4), or b) a silicone with acrylate vinyl terminates or branches (FIG. 5A), or c) a silicone with arylvinyl terminates or branches (FIG. 5B); or d) any combinations of the above three (examples in FIGS. 5C and 5D). In another embodiment, base agent 142 may include a vinylmethyl dimethyl copolymer. With regard to curing agent 144, in one embodiment, curing agent 144 may include methylhydro phenylmethyl siloxane or methylhydro dimethyl siloxane, having trimethylsiloxyl terminals. In another embodiment, curing agent 144 may include at least one of: a hydrogen terminated siloxane, a hydrogen branched siloxane, methylhydro phenymethyl siloxane or a combination thereof. In one embodiment, a ratio between base agent 142 and curing agent 144 may be within the range of approximately 30:1 to approximately 1:20. A ratio between linearly structured polymer 130 and crosslinker 140 in the mixture may be within the range of approximately 30:1 to approximately 1:30.

Figure 6:
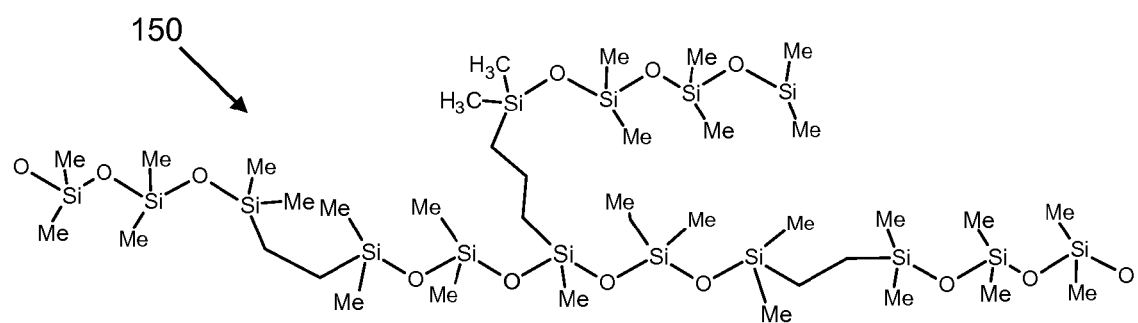
FIG. 6 shows a resulting polymer blend system LTI according to the disclosure.
Figure 7:
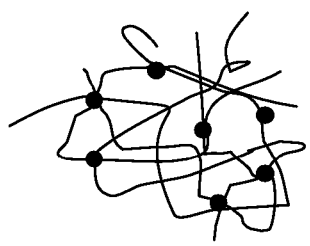
FIG. 7 shows a schematic of strands of a LTI including a mixture of a linearly structured polymer doped with crosslinked networks according to the disclosure.

Curing of the mixture results in a polymer blend system LTI 150 as illustrated in FIG. 6. As illustrated, LTI 150 includes a linearly structured polymer doped with crossed-linked networks. Alkyl groups employed may be methyl, ethyl, phenyl or aryl groups. In one embodiment, curing may occur at a temperature between approximately 80° C. and approximately 165° C. In another embodiment curing may occur at a temperature of approximately 125° C. FIG. 7 shows a schematic of strands of LTI 150, which illustrates that the polymer exhibits reduced liquid polymer macromolecule mobility, thus improved surface tension compared to linearly structured polymer 130 (FIG. 2). As a result, polymer 150 can be used as an LTI.

The methods and structures as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:

forming a liquid thermal interface material consisting of a linear siloxane and a crosslinker, the crosslinker consisting of a vinyl-terminated or branched polydimethylsiloxane base agent, and a hydrogen-terminated polydimethylsiloxane curing agent;

curing the liquid thermal interface material;

applying the liquid thermal interface material to an integrated circuit chip as a liquid thermal interface;

burning-in or testing the integrated circuit chip with the liquid thermal interface on the integrated circuit chip; and removing the liquid thermal interface from the integrated circuit chip after burning-in or testing of the integrated circuit chip.

2. The method of claim 1, wherein the curing occurs at a temperature between approximately 80° C. and approximately 165° C.

3. The method of claim 2, wherein the curing occurs at a temperature of approximately 125° C.

* * * * *